(12) United States Patent
Erie et al.

(10) Patent No.: US 10,042,333 B2
(45) Date of Patent: Aug. 7, 2018

(54) EMBEDDED DYNAMIC STABILITY MEASUREMENT, OPTIMIZATION AND ALARM SYSTEM

(71) Applicant: International Business Machines Corporation, Armonk, NY (US)

(72) Inventors: Clinton W. Erie, Adams, MN (US); Jason S. Lee, Oronoco, MN (US); Michael J. Macpherson, Elgin, MN (US); Ryan T. Paske, Rochester, MN (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 15/431,276

(22) Filed: Feb. 13, 2017

(65) Prior Publication Data
US 2018/0143597 A1 May 24, 2018

Related U.S. Application Data

(63) Continuation of application No. 15/358,374, filed on Nov. 22, 2016.

(51) Int. Cl.
| | | |
|---|---|---|
| *G06F 7/00* | (2006.01) | |
| *G05B 13/02* | (2006.01) | |
| *G06N 7/00* | (2006.01) | |
| *G05D 1/08* | (2006.01) | |

(52) U.S. Cl.
CPC ......... *G05B 13/026* (2013.01); *G05D 1/0891* (2013.01); *G06N 7/005* (2013.01); *G05D 2201/0216* (2013.01)

(58) Field of Classification Search
None
See application file for complete search history.

(56) References Cited

U.S. PATENT DOCUMENTS

| | | | |
|---|---|---|---|
| 9,358,975 B1* | 6/2016 | Watts | B60W 30/04 |
| 2014/0288705 A1* | 9/2014 | Yun | B62D 57/032 |
| | | | 700/246 |
| 2017/0130429 A1* | 5/2017 | Lafrenier | E02F 9/26 |

OTHER PUBLICATIONS

List of IBM Patents or Patent Applications Treated as Related; (Appendix P), Filed Feb. 13, 2017; 2 pages.
Clinton W. Erie et al., "Embedded Dynamic Stability Measurement, Optimization and Alarm System", U.S. Appl. No. 15/358,374, filed Nov. 22, 2016.

* cited by examiner

*Primary Examiner* — Yolanda R Cumbess
(74) *Attorney, Agent, or Firm* — Cantor Colburn LLP

(57) ABSTRACT

An intelligent load control device is provided for operable incorporation in an object. The intelligent load control device includes devices disposed about the object to detect characteristics thereof that are relevant to an object tipping event, a response system, and a processing unit. The response system is configured to take an action to mitigate risks associated with the object tipping event responsive to received control instructions. The processing unit is disposed to be receptive of the detected characteristics from the devices and to issue the control instructions to the response system. The processing unit is configured to dynamically analyze the detected characteristics to determine a likelihood of the object tipping event and to issue the control instructions in accordance with the determined likelihood.

7 Claims, 4 Drawing Sheets

FIG. 5
FIG. 6
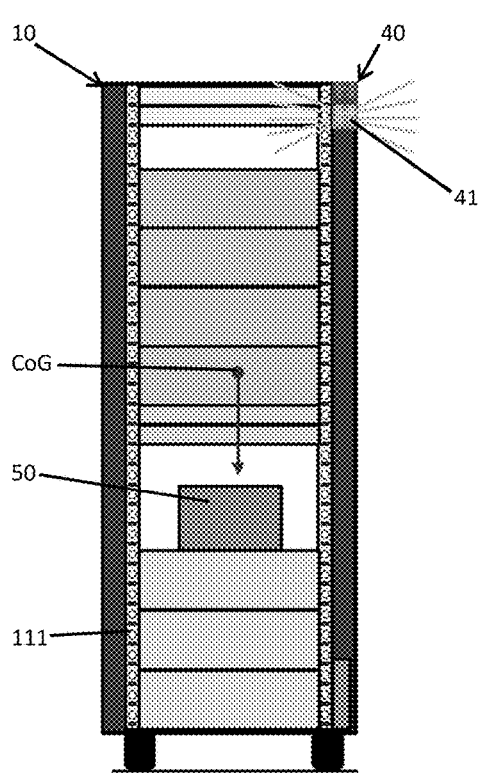
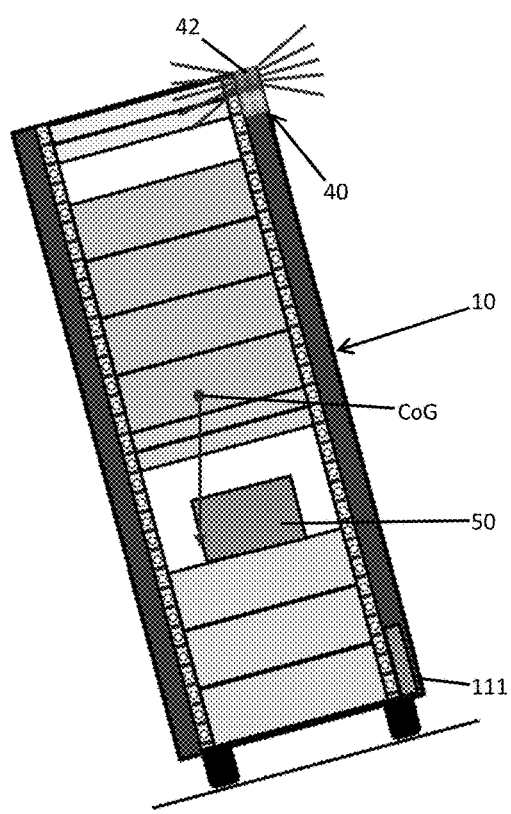

EMBEDDED DYNAMIC STABILITY MEASUREMENT, OPTIMIZATION AND ALARM SYSTEM

CROSS-REFERENCE TO RELATED APPLICATION

This application is a continuation of and claims the benefit or priority of U.S. application Ser. No. 15/358,374, which was filed on Nov. 22, 2016. The entire contents of U.S. application Ser. No. 15/358,374 are incorporated herein by reference.

BACKGROUND

The present invention relates to an embedded dynamic stability measurement, optimization and alarm system and, more specifically, to an embedded dynamic stability measurement, optimization, and alarm system for a rack that is heavy and tall.

It is commonplace in the computer server industry to integrate servers into racks because racks provide stackable mounting and power infrastructure for the efficient housing of such servers. The racks may be up to two meters tall and, depending on where the server is installed in the rack, the rack can become prone to tipping. This happens, in particular, when the rack's center of gravity is raised above and outside of a point of stability and can be especially problematic if the rack is moved and/or disposed at an angle. That is, rack tipping frequently occurs when a rack is loaded with servers and then moved up a ramp, on a truck tailgate or on a fork lift even if standard tilt guidelines are met.

SUMMARY

According to an embodiment of the present invention, an intelligent load control device is provided for operable incorporation in an object. The intelligent load control device includes devices disposed about the object to detect characteristics thereof that are relevant to an object tipping event, a response system, and a processing unit. The response system is configured to take an action to mitigate risks associated with the object tipping event responsive to received control instructions. The processing unit is disposed to be receptive of the detected characteristics from the devices and to issue the control instructions to the response system. The processing unit is configured to dynamically analyze the detected characteristics to determine a likelihood of the object tipping event and to issue the control instructions in accordance with the determined likelihood.

According to another embodiment of the present invention, a movable object is provided. The movable object includes casters and a rack frame that is supportively disposed on the casters. One or more computing devices are disposable in one or more arrangements on the rack frame. The movable object further includes devices disposed at various locations in the rack frame to detect characteristics thereof that are relevant to a tipping event, a response system, and a processing unit. The response system is embedded in the rack frame and is configured to take an appropriate one of an escalating set of actions to mitigate risks associated with the tipping event responsive to received control instructions. The processing unit is embedded within the rack frame and disposed for the reception of the detected characteristics from the devices and for the issuance of the control instructions to the response system. The processing unit is configured to dynamically analyze the detected characteristics to determine a likelihood of the tipping event and to issue the control instructions in accordance with the determined likelihood.

According to yet another embodiment of the present invention, a method of operating an intelligent load control device that is operably incorporated in an object is provided. The method includes detecting, at various locations of the object, characteristics thereof that are relevant to a tipping event and dynamically analyzing the detected characteristics at a processing unit embedded in the object to determine a likelihood that the tipping event will occur. The method further includes issuing control instructions in accordance with the determined likelihood from the processing unit to a response system embedded in the object and actuating the response system to take an action to mitigate risks associated with the tipping event responsive to the control instructions.

BRIEF DESCRIPTION OF THE DRAWINGS

The subject matter which is regarded as the invention is particularly pointed out and distinctly claimed. The foregoing and other features, and advantages of the invention are apparent from the following detailed description taken in conjunction with the accompanying drawings in which:

FIG. 5 is an illustration of a low-level warning element of the movable object, which is activated during a relatively low-risk level event, in accordance with embodiments;

FIG. 6 is an illustration of a high-level warning element of the movable object, which is activated during a relatively high-risk level event, in accordance with embodiments;

DETAILED DESCRIPTION

Figure 1:
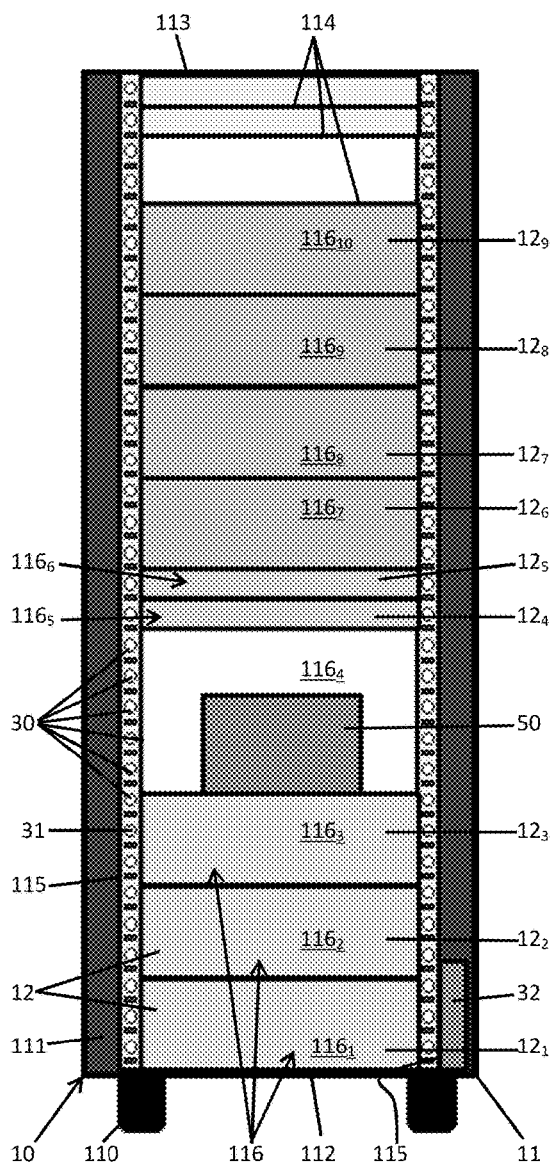
FIG. 1 is an elevation view of a movable object in accordance with embodiments.

While some but certainly not all currently available or conventional racks for servers or other heavy, movable objects can include tilting tables with scales on their corners or fixed tilt tables with load cells that facilitate measurement of various parameters required for tilt calculation in a fixed location, the most comprehensive anti-tilt systems are still of limited real-world use. Typically, such systems only measure rack parameters in static environments and often require external measurement devices for further calculations (e.g., center of gravity determinations). That is, none of the anti-tilt systems are able to measure tilt characteristics of a movable object or to calculate its center of gravity and stability metrics without external assistance or the application of tilt to the rack. The latter issue is particularly troublesome because requiring tilt to obtain a center of gravity (CoG) value, for example, opens the door to safety issues as the very situation the systems are trying to avoid has to be initiated and cannot always be done under controlled environments such as large, expensive and immovable fixtures designed specifically for testing purposes.

As an additional issue, none of the anti-tilt systems can actually be embedded into the movable object in question and thus they cannot provide real-time, on-the-fly recalculations of the CoG or other stability parameters as the movable object encounters real-world obstacles or impediments ('I have a 10 degree ramp; will my rack tilt when I move it up that ramp?'). Thus, no systems are available that can make reconfiguration recommendations specific to those custom conditions. Finally, none of the anti-tilt systems are able to provide real-time warnings or alarms if a dangerous tilt situation is about to occur, enabling personnel to respond and take appropriate action before harm occurs. ('I was starting to push my rack up the 10-degree ramp into my data center, when the tilt alarm sounded. Without this device, I would never have known there was an issue until the rack started to tip over . . . with it, I was able to stop moving the rack, determine exactly what needed to be moved or removed to stabilize the rack, and move forward with this rack move in a safe way.')

Thus, as will be described below, an intelligent device is provided that could be independent or embedded into a rack in order to dynamically measure and optimize stability and in order to issue an alarm or take other action when a tipping event is imminent. The intelligent device may include a strain-measurement system along with an angle and/or load sensing technology at a plurality of relevant points in the unit, an optional velocity or acceleration measurement device to measure a velocity or acceleration of the rack and a processing unit. The processing unit can be used to determine the center of gravity of the rack (i.e., a three-dimensional (3D) object), calculate a tipping point and, based on preset parameters, provide advice to an operator as to how to reduce a likelihood of a tipping event (e.g., by suggesting that the operator reduce movement speed, remove weight from the rack or adding weight to the lower end of the rack), provide a warning to an operator that the rack is within danger of tipping over and/or take other corrective actions.

While the intelligent device can be applicable to the rack industry and associated technologies, it is to be understood that the concept can be applied to many other industries and technologies as well. These include, but are not limited to, furniture or heavy machinery moving industries and material handling applications (e.g., safe freestanding shelf loading).

With reference to FIG. 1, a movable object 10 is provided and may be configured as a rack-mount 11 for one or more computing devices 12. While the movable object 10 is illustrated as the rack mount 11 for the one or more computing devices 12, it is to be understood that other configurations and uses are possible and that the use of the rack mount embodiment is done for clarity and brevity and is not intended to otherwise limit the scope of this application. In addition, the one or more computing devices 12 are drawn as a plurality of computing devices 12 or, more particularly, as first computing device $12_1$, second computing device $12_2$, third computing device $12_3$, fourth computing device $12_4$, fifth computing device $12_5$, sixth computing device $12_6$, seventh computing device $12_7$, eighth computing device $12_8$ and ninth computing device $12_9$. This is again done for clarity and brevity and should not be interpreted as limiting the scope of the application in any way.

The following description will relate only to the case of the movable object 10 being provided as the rack mount 11 and the one or more computing devices 12 being provided as the first computing device $12_1$, the second computing device $12_2$, the third computing device $12_3$, the fourth computing device $12_4$, the fifth computing device $12_5$, the sixth computing device $12_6$, the seventh computing device $12_7$, the eighth computing device $12_8$ and the ninth computing device $12_9$.

The rack mount 11 includes a set of casters 110 and a rack frame 111 that is supportively disposed on the casters 110 and on which the one or more computing devices 12 are disposable in one or more arrangements. Each of the casters 110 may be provided as wheeled-elements and may include a base that attaches to the rack frame 111 and wheel housing that extends downwardly from the base, an axle that extends between opposite sides of the wheel housing and a wheel that is rotatably supported along the axle between the opposite sides of the wheel housing. Each of the casters 110 may also include a swivel element within the base or the wheel housing that allows the wheel to rotate or swivel (see FIG. 2) about a rotational axis defined along a height dimension of the rack frame 111. The wheels and the swivel elements allow for the rack mount 11 to be pushed along a surface (e.g., a floor) and redirected or swiveled as needed.

The rack frame 111 includes a lower base 112, an upper base 113, intermediate bases 114 and sidewalls or rails 115. The lower base 112 sits directly on the casters 110 and the rails 115 extend upwardly from the lower base 112. The intermediate bases 114 and the upper base 113 are supportively disposed in sequence above the lower base 112 at various and modifiable height levels along the vertical extent of the rails 115 such that the lower base 112, the intermediate bases 114, the upper base 113 and the rails 115 define slots 116 into which each of the one or more computing devices 12 are receivable. That is, the lower base 112, the rails 115 and the lower-most one of the intermediate bases 114 define a first slot $116_1$ that may be receptive of the first computing device $12_1$ in one or more arrangements of the one or more computing devices 12 (in a similar fashion, the second computing device $12_2$ is receivable in a second slot $116_2$, the third computing device $12_3$ is receivable in a third slot $116_3$, the fourth computing device $12_4$ is receivable in a fifth slot $116_5$, the fifth computing device $12_5$ is receivable in a sixth slot $116_6$, the sixth computing device $12_6$ is receivable in a seventh slot $116_7$, the seventh computing device $12_7$ is receivable in an eighth slot $116_8$, the eighth computing device $12_8$ is receivable in a ninth slot $116_9$ and the ninth computing device $12_9$ is receivable in a tenth slot $116_{10}$).

Thus, for those ones of the one or more computing devices 12 that have similar dimensions and specifications, re-arrangements are effectuated by a simple switch among respective slots. For example, the eighth computing device $12_8$ can be slid into the tenth slot $116_{10}$ and the ninth computing device $12_9$ can be slid into the tenth slot $116_{10}$. However, for those ones of the one or more computing devices 12 that have different dimensions and specifications, re-arrangements may require further re-configurations of the rack frame 111. For example, if one desired to install the ninth computing device $12_9$ into the sixth slot $116_6$, it would be necessary to move the at least the sixth intermediate base 114 upwardly along the rails 115.

Figure 2:
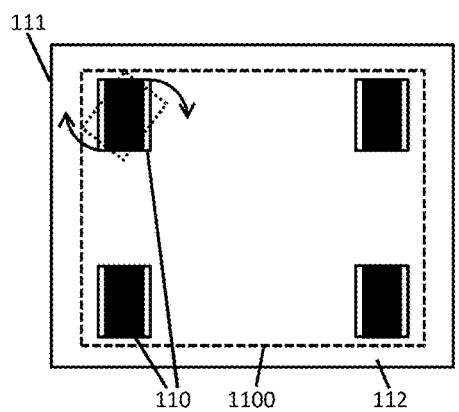
FIG. 2 is a view of casters of the movable object taken along line 2-2 of FIG. 1.

With reference to FIG. 2, the casters 110 may be respectively arranged at or proximate to the corners of the rack frame 111. The casters 110 thus define a wheelbase 1100 that stably supports the rack frame 111 and the one or more computing devices 12 under certain normal conditions. As used herein, such certain normal conditions include, for example, fully loaded conditions in which the rack frame 111 is fully loaded with the one or more computing devices 12 or some other weighted elements as is disposed on a flat or nearly flat surface while not moving or moving very slowly.

Figure 3:
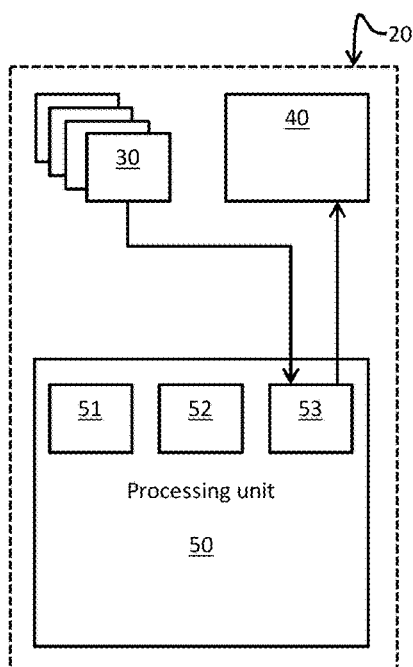
FIG. 3 is a schematic diagram illustrating communications between devices of the movable object, a response system embedded in the movable object and a processing unit of the movable object in accordance with embodiments.
Figure 4:
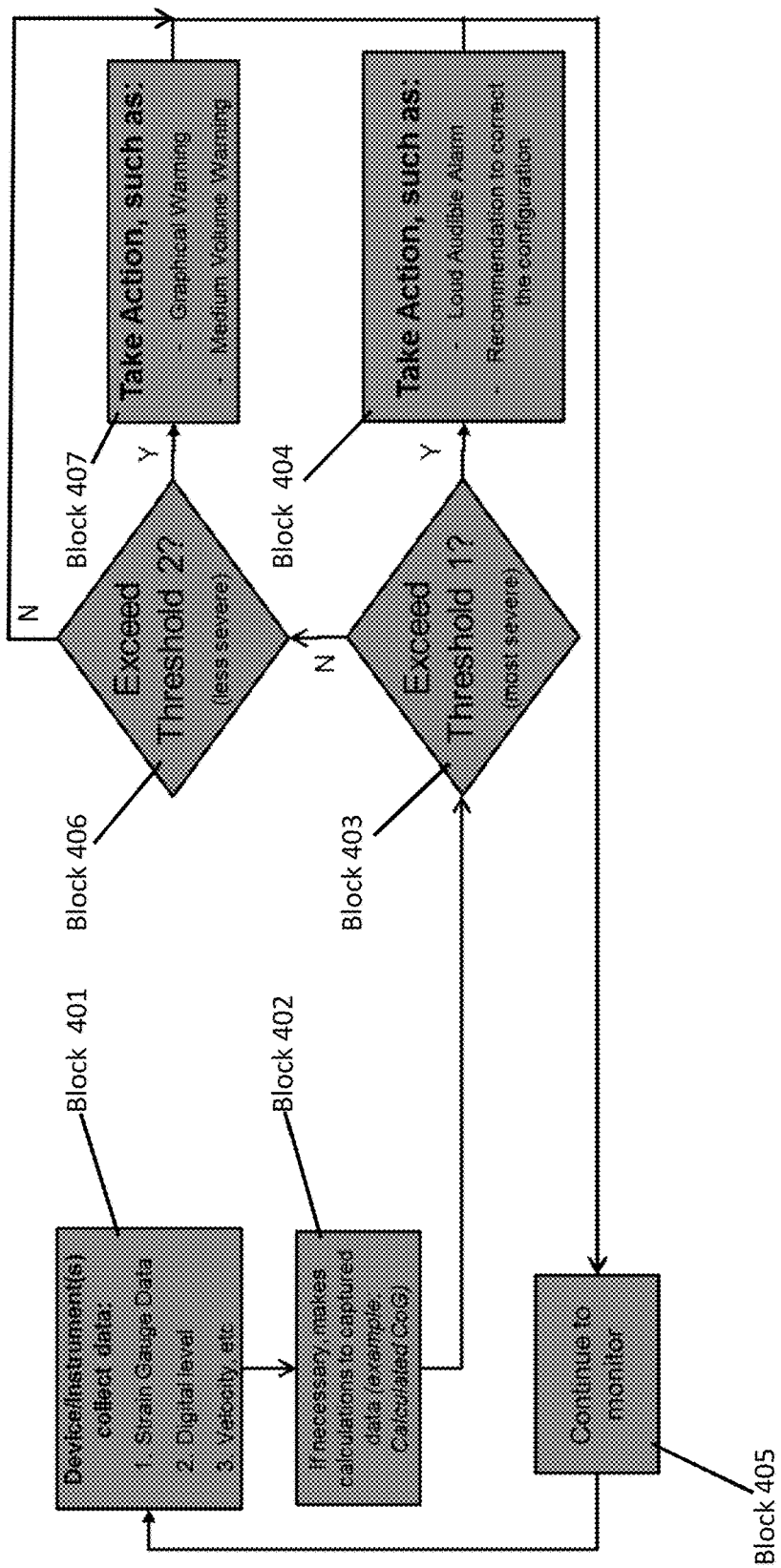
FIG. 4 is a flow diagram illustrating a method of operating an intelligent load control device that is operably incorporated in an object, such as the movable object, in accordance with embodiments.

However and with continued reference to FIG. 1 and additional reference to FIGS. 3 and 4, since the certain normal conditions are not always encountered during real-world activity, an aspect of the following description relates to the movable object 10, an intelligent load control device 20 that is provided for operable incorporation in an object, such as the movable object 10, and a method of operating the intelligent load control device 20 that is operably incorporated in an object, such as the movable object 10. Further aspects relate to allowing for stable support of the movable object 10 in certain other conditions or for the actuation of a warning or alert to a user that a tipping event is or may be imminent and that current operating conditions need to be halted or changed and/or that the arrangements of the rack frame 111 and the one or more computing devices 12 may need to be re-arranged.

With continued reference to FIGS. 1, 3 and FIG. 4 and with additional reference to the illustrations of FIGS. 5 and 6, the intelligent load control device 20 is incorporated into the movable object 10 and includes devices 30, a response system 40 (see FIGS. 5 and 6) and a processing unit 50. The devices 30 are disposed at various locations in the rack frame 111 to detect certain characteristics of the rack frame 111 that are relevant to a tipping event of the rack frame 111. The response system 40 is embedded in the rack frame 111 and is configured to take an appropriate one of an escalating set of actions to mitigate risks associated with the tipping event occurring in response to received control instructions. The processing unit 50 is embedded in the rack frame 111 and is disposed for the reception of the detected characteristics from the devices 30 and for the issuance of the control instructions to the response system 40. The processing unit 50 is configured to dynamically analyze the detected characteristics to determine a likelihood of the tipping event actually occurring in a given instance and to issue the control instructions in accordance with the determined likelihood. In accordance with embodiments, the processing unit 50 may be operably coupled to the devices 30 and the response system 40 by way of wired or wireless connections. The control instructions may be variable based on a relative value of the likelihood of the tipping event.

The processing unit 50 may be, but is not required to be, installed within one of the slots 116. For example, as shown in FIG. 1, the processing unit 50 may be installed within the fourth slot 116₄. In any case, as shown in FIG. 3, the processing unit 50 may include a central processor 51, a memory unit 52 and a networking unit 53 by which the processing unit 50 is communicative with the devices 30 and the response system 40. The memory unit 52 has executable instructions stored thereon, which, when executed, cause the processor 51 to execute the methods and operations described herein.

The devices 30 may include strain gauges 31 and an embedded tilt calculator with an angle sensor (or "tilt calculator" 32). The devices 30 may, but are not required to, also include velocity sensors and acceleration sensors (e.g., accelerometers) as part of the tilt calculator 32 or as stand-alone components. The strain gauges 31 may be provided as at least one or more strain gauges 31 for each of the slots 116 at each of the rails 115. Thus, a number of the strain gauges 31 may be at least four times the number of slots 116 (as illustrated in FIG. 1, there are three strain gauges 31 at each rail 115 for each slot 116, making the total number of illustrated strain gauges 31 twelve times the number of slots 116). The tilt calculator 32 may be provided within one or more of the rails 115 proximate to the lower base 112.

With the strain gauges 31 and the tilt calculator 32 provided as described above, an operation of the intelligent load control device 20 can now be explained in detail.

At an initial time, a weight and a CoG of the empty rack frame 111 are known and is the strain on each strain gauge 31 at each rail 115. In addition, information about each of the one or more computing devices 12 (e.g., unit weights, configurations, and baseline/normal CoGs) may also be known but are not necessarily required for operation of the intelligent load control device 20. In any case, with the initial information in hand, strain at each location that is caused by weighted elements above that location are removed to obtain a true strain at that location as caused by the weighted element that is mounted therein with this formula:

Net Strain(location $a1$)=Strain(location $a1$)−Strain (location $a2$) ... −Strain(location $an$).

Next, a weight W is calculated as a representation of each local strain calculation using the formula for strain and a known Modulus of Elasticity E of the material of the rails 115, the length L of the rails 115 from the lower base 112 to a current point and an area of the material of the rails 115:

$A=(L \times W)$

Stress=Strain*$E$,

Stress=$W/A$, $W/A$=Strain*$E$, and $W$=Strain*$E$*$A$.

With the weight on each corner of each slot 116 thus known, a CoG location for the movable object 10 in x and y dimensions can now be calculated using the formulae:

$Dx(a,c)$=distance to center of front rails$(a,c)$ or back rails$(b,d)$ from side of rack, $Dy(a,b)$=distance to center of side rails$(a,b$ or $c,d)$ from front of rack, $Wan$=weight at meeting point an where lines connecting opposite rails cross, $Xn=((Dx(a,c)*Wan+Wcn)+(Dx(b,d)*Wbn+Wdn))/Wan+Wbn+Wcn+Wdn$, and $Yn=((Dy(a,b)*Wan+Wbn)+(Dy(c,d)*Wcn+Wdn))/Wan+Wbn+Wcn+Wdn$.

Here, the variable that would be denoted Zn is assumed to be defined at the top of the slot 116 where the weighted element n is located (this is known because there is no additional strain in the rails 115 between the unit n and a unit above it until the mounting location for unit n is reached). This assumes a 'worst case' scenario. However, if an angle is reached in transit, then it becomes possible to calculate Zn using the following formulae with angle $\Phi x$ and $\Phi y$, measured in the x and y directions with respect to axis z:

$Zxn=((Dx(a,c)*\cos \Phi x°)*Wan+Wcn)+(Dy(b,d)*\cos \Phi x°)*Wbn+Wdn))/Wan+Wbn+Wcn+Wdn$, and $$Zyn=((Dx(a,b)^*)\text{Cos }\Phi y°)^* Wan+Wbn)+(Dy(c,d)$$
$$^*\text{Cos }\Phi y°)^* Wcn+Wdn))/Wan+Wbn+Wcn+Wdn.$$

Once all of the CoG locations are known, it is possible to find the sum of the weights at each mounting location to find the total weight of each of the one or more computing devices 12 and then to calculate the overall rack mount 11 CoG position from the location and relative weight applied at each unit's calculated CoG and the original CoG. At this point, a tipping point can be calculated based on the wheelbase 1100 of the casters 110 with respect to a tilt specification value or to an actual tilt angle that is encountered by the movable object 10.

Thus, as shown in FIG. 4, a method of operating the intelligent load control device 20 in operable incorporation with an object, such as the movable object 10, is provided. The method includes detecting, using the devices 30 at various locations of the movable object 10, characteristics of the movable object 10 that are relevant to a tipping event (block 401) and dynamically analyzing the detected characteristics at the processing unit 50 to determine a likelihood that the tipping event will occur (block 402). Such analyzing may include, for example, the calculations described above to capture the original CoG and the CoG of the fully loaded rack frame 111 (e.g., dynamic, real-time calculations of a CoG of the rack frame 111 under various load conditions and identifications of whether an instance of the CoG drifting to or beyond the wheelbase 1100 is or will be in imminent effect, analyses of the detected characteristics to identify incidents of strain changes in the rack frame 111 and analyses of the detected characteristics to identify when an orientation of the rack frame 111 exceeds a predefined angle or limit).

The processing unit 50 may compare the determined likelihood with a most severe threshold (block 403) and then take a first action if the result of the comparison is deemed affirmative (block 404) followed by a continued monitoring action (block 405) or, if the result of the comparison is deemed negative, the processing unit 50 will proceed to compare the determined likelihood with a less severe threshold (block 406). In an event a result of the comparison of block 406 is deemed affirmative, the processing unit 50 will take a second action (block 407) followed by the continued monitoring of block 405 or, in an event a result of the comparison of block 406 is deemed negative, the processing unit 50 will simply proceed to the continued monitoring of block 405.

In accordance with embodiments, an action taken by the processing unit 50 at block 404 may include an issuance of the control instructions that are associated with most severe conditions (e.g., a tipping event of the movable object 10 is imminent) to the response system 40 and a corresponding actuation of the response system 40 to take one or more of a set of prescribed escalating actions to mitigate risks associated with the tipping event occurring or becoming increasingly likely. Similarly, another action taken by the processing unit 50 at block 407 may include an issuance of the control instructions that are associated with less severe conditions (e.g., a tipping event of the movable object 10 is not yet imminent but that a risk is elevated nonetheless) to the response system 40 and a corresponding actuation of the response system 40 to take one or more of the set of prescribed escalating actions to mitigate risks associated with the tipping event occurring or becoming increasingly likely.

In an exemplary case, as shown in the illustration of FIG. 5, the movable object 10 may be provided such that the CoG is determined to be located in a central point of the rack frame 111 and that it is pointed substantially downwardly through a central point in the wheelbase 1100. In this case, if the movable object 10 is being pushed along a floor space that the processing unit 50 is, for example, programmed to recognize as being bumpy or tilted in some locations or if the movable object 10 is being pushed faster than it should be, the processing unit 50 may determine that a present likelihood of a tipping event is relatively low but that a risk still exists and thus issues control instructions to the response system 40 to activate a low level warning element 41. Such low-level warning element 41 may be provided as a dimly blinking light or graphical display, a low-level sound or a low-level vibration that informs the user or operator that present conditions of the movable object 10 have an elevated risk of a tipping event even if the tipping event is not imminent.

By contrast, as shown in the illustration of FIG. 6, the movable object 10 may be provided such that the CoG is determined to be located in a central point of the rack frame 111 but that the rack frame 111 is tilted such that the CoG is pointed at or outside the wheelbase 1100. In this case, the processing unit 50 may determine that a present likelihood of a tipping event is relatively high and that a risk exists. Here, the processing unit 50 may issue control instructions to the response system 40 to activate a high level warning element 42 where such a high-level warning element 42 may be provided as a brightly blinking light or graphical display, a loud sound or a strong vibration that informs the user or operator that present conditions of the movable object 10 have a severe risk of a tipping event occurring imminently.

That is, in accordance with embodiments and, as shown in FIGS. 5 and 6, the response system 40 may include variable graphical, audible or haptic warning elements (see, e.g., the low-level warning element 41 of FIG. 5 and the high-level warning element 42 of FIG. 6). However, it is to be understood that the response system 40 may include other features as well.

Figure 7:
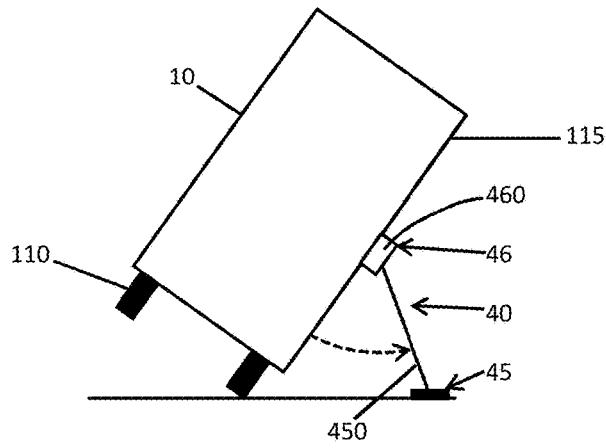
FIG. 7 is an illustration of a deployable anti-tipping countermeasure of the movable object in accordance with embodiments.
Figure 8:
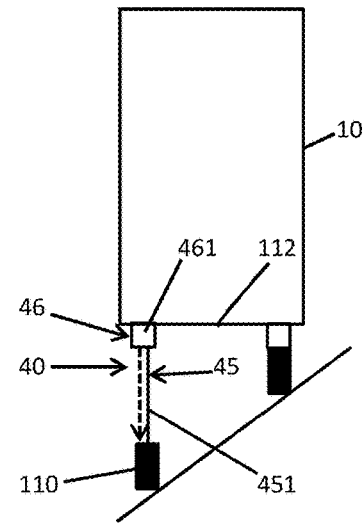
FIG. 8 is an illustration of a deployable anti-tipping countermeasure of the movable object in accordance with embodiments.

With reference to FIGS. 7 and 8, the response system 40 may include deployable anti-tipping countermeasures 45 and corresponding servo elements 46. As shown in FIG. 7, the deployable anti-tipping countermeasures 45 may include a support arm 450 (or airbags) that is coupled to servo element 460 at one or more rails 115. During operation of the intelligent load control device 20, if and when the processing unit 50 determines that a tipping event is actually imminent or already in progress, the processing unit 50 can issue control instructions to the response system 40 whereby the servo element 460 causes the support arm 450 to deploy outwardly to stop the tipping event from continuing. As shown in FIG. 8, the deployable anti-tipping countermeasures 45 may include an extending caster 451 that is coupled to servo element 461 at the lower base 112. Here, during operation of the intelligent load control device 20, if and when the processing unit 50 determines that a gradient in a surface over which the movable object 10 is moving is so great that it would lead to a tipping event, the processing unit 50 can issue control instructions to the response system 40 whereby the servo element 461 causes the extending caster 451 to extend downwardly to thereby level the movable object 10 and to prevent the tipping event from occurring.

Figure 9:
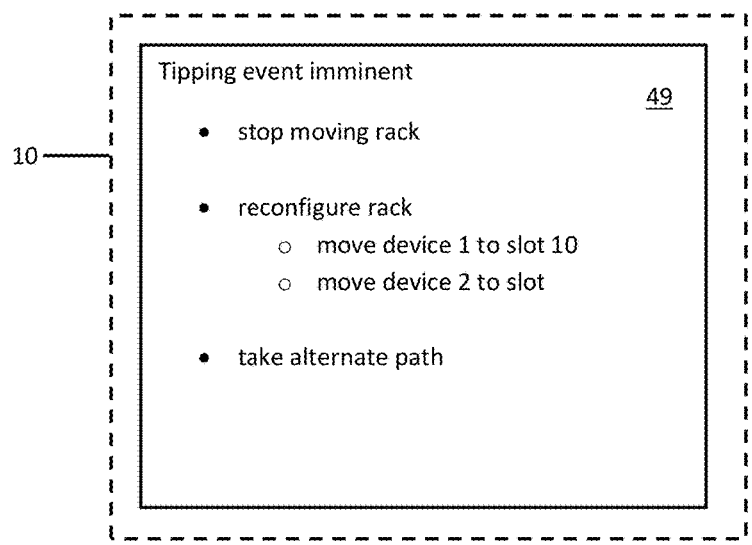
FIG. 9 is an illustration of a user interface of the movable object in accordance with embodiments.

With reference to FIG. 9, the response system 40 may include a graphical user interface (GUI) 49. As shown in FIG. 9, the graphical user interface 49 can be used to notify a user or operator that a tipping event is likely or imminent and to provide the user or operator with recommendations for how to mitigate the risk of the tipping event occurring.

That is, the GUI 49 may suggest that the operator stops moving the movable object 10 and re-arrange some or all of the one or more computing devices 12 (e.g., by moving the heaviest computing devices 12 to lower slots 116 so that the CoG remains directed through a central portion of the wheelbase 1100). In cases where the processing unit 50 is aware of surrounding areas, the GUI 49 can also make recommendations relating to pathways an operator can or should follow in order to avoid certain non-traversable areas.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of operating an intelligent load control device that is operably incorporated in an object, the method comprising:

arranging casters to define a wheelbase;

supportively disposing a rack frame, on which one or more computing devices are disposable in one or more arrangements, on the casters by disposing a lower base on the casters, disposing intermediate and upper bases above the lower base and extending rails upwardly from the lower base to support the intermediate and upper bases at variable heights for defining slots receptive of the one or more computing devices;

detecting, at various locations of the rack frame, characteristics thereof that are relevant to a tipping event;

dynamically analyzing the detected characteristics at a processing unit embedded in the rack frame to determine a likelihood that the tipping event will occur;

issuing control instructions in accordance with the determined likelihood from the processing unit to a response system embedded in the rack frame; and actuating the response system to take an action to mitigate risks associated with the tipping event responsive to the control instructions.

2. The method according to claim 1, wherein the actuating of the response system comprises deploying anti-tipping countermeasures.

3. The method according to claim 2, wherein the deploying of the anti-tipping countermeasures comprises extending a support arm outwardly from the rack mount.

4. The method according to claim 2, wherein the deploying of the anti-tipping countermeasures comprises adjusting relative heights of one or more of the casters.

5. The method according to claim 1, wherein the actuating of the response system comprises reconfiguring the one or more computing devices.

6. The method according to claim 1, wherein the dynamically analyzing of the detected characteristics comprises:

calculating a center of gravity of the rack frame; and identifying whether an instance of the center of gravity drifting to or beyond a wheelbase of the rack frame is or will be in imminent effect.

7. The method according to claim 1, wherein the dynamically analyzing of the detected characteristics comprises:

identifying incidents of strain changes in the rack frame; and identifying when an orientation of the rack frame exceeds a predefined limit.

\* \* \* \* \*